G. W. BOWER.
SUSPENSION FOR TROLLEY WIRES AND THE LIKE.
APPLICATION FILED OCT. 19, 1920.
1,420,407.
Patented June 20, 1922.
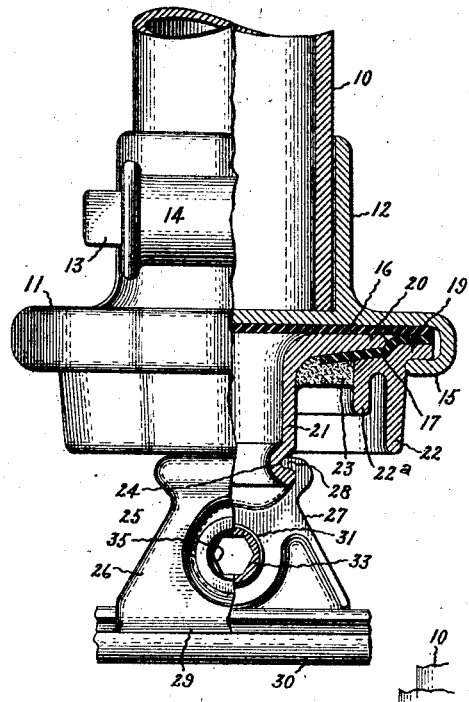
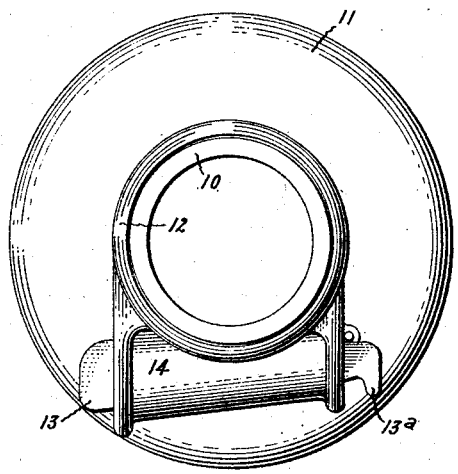
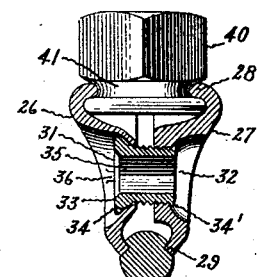
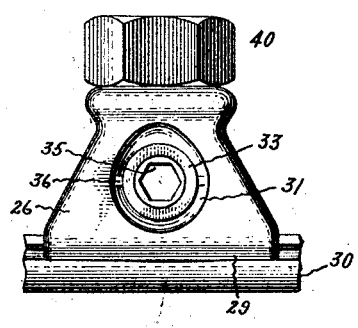
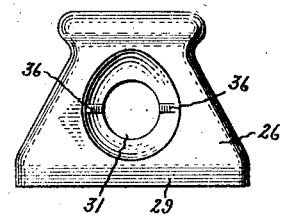
Inventor:
George W. Bower,
by *Albert G. Davis*
His Attorney.

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

SUSPENSION FOR TROLLEY WIRES AND THE LIKE.

1,420,407.  Specification of Letters Patent.  Patented June 20, 1922.

Application filed October 19, 1920. Serial No. 418,092.

*To all whom it may concern:*

Be it known that I, GEORGE W. BOWER, a citizen of the United States, residing at Schenectady, county of Schenectady, State of New York, have invented certain new and useful Improvements in Suspensions for Trolley Wires and the like, of which the following is a specification.

The present invention relates to insulator suspensions for trolley wires and the like and has for its object to provide an improved structure and arrangement in a device of this character.

For a consideration of what I believe to be novel and my invention, attention is directed to the accompanying description and the claims appended thereto.

In the drawing, Fig. 1 is a side elevation partly in section of a suspension embodying my invention; Fig. 2 is a top plan view thereof; Fig. 3 is a detail side view partly in section of certain parts, looking toward the left of Fig. 2; Fig. 4 is a side elevation of a trolley clamping ear as shown in Fig. 1 attached to an adapter in the form of a nut; Fig. 5 is a transverse sectional view of the clamping ear; Fig. 6 is a side view of one of the members of the clamping ear; and Fig. 7 is a bottom plan view of the clamping ear illustrating the manner in which it clamps with a trolley wire.

The trolley wire suspension specifically illustrated in the drawing is intended particularly for use in mines, and 10 indicates an overhead supporting member here shown in the form of a pipe which may depend from the top of a mine. As is well understood such pipes may be vertical or they may extend at an angle to the horizontal depending on the way the mine shaft runs.

The suspension comprises a plate 11 having a sleeve 12 projecting from one side adapted to slip over the end of pipe 10 and be fastened thereto by a wedge 13. Wedge 13 is preferably triangular in section and tapers from one end to the other, and formed integral with sleeve 12 is a tapered housing 14 in which the wedge is located. The ends of the housing are provided with triangular openings $14^a$ beyond which the ends of the wedge project. At the small end of the wedge is a nose $13^a$ and after the wedge has been inserted a pin as shown at $14^b$ or other suitable means is fixed across the one opening $14^a$ to lock the wedge in the housing so it cannot come out during shipment or when being installed. The pin $14^b$ serves to hold nose $13^a$ beyond the edge of the adjacent opening $14^a$ but permits sufficient sliding movement of wedge 13 so it can be utilized to fix the suspension to support 10. The wedge is so positioned that it presents one edge toward the center of the sleeve and the arrangement is such that when the wedge is driven in this edge bites into the side of pipe 10 to firmly fix the suspension to the pipe. This makes a fastening means which is positive in operation and very quickly operated to either fasten or release the suspension to or from the pipe.

Plate 11 is preferably made of malleable iron and its peripheral edge is turned under as shown at 15 to form a clamping means in which is held the peripheral edges of a plate of insulation 16, a disk of insulation 17, and a holding ring 19. Between insulating plate 16 and plate 11 on the one hand and insulating disk 17 and holding ring 19 on the other hand is clamped a flange 20 on the upper edge of a short supporting tube 21. Flange 20 is of less diameter than insulating members 16 and 17 and ring 19 is so shaped that members 16 and 17 are clamped in firm engagement with each other at their outer edges. By this arrangement tube 21 and flange 20 are completely insulated from plate 11 and ring 19. Depending from ring 19 is a suitable skirt means which serves to shed moisture, two concentric skirts 22 and $22^a$ being shown in the present instance. The use of two skirts as shown, one being shorter than the other is of particular utility in shedding moisture when the suspension hangs at an angle to the vertical as any drip from the top of the outer skirt will be caught by the inner one. The use of two skirts also increases the creepage distance from skirt 22 to tube 21. At 23 is an insulating and moisture proof sealing compound which serves to prevent any moisture from getting to the insulating members 16 and 17. In assembling, insulating plate 16, insulating disk 17, holding ring 19 and flange 20 are mounted on plate 11 in the order shown in Fig. 1 after which the edge of plate 11 is rolled under to tightly clamp the parts together. In this connection it is to be noted that the edge of plate 11 is rolled under directly against metallic ring 19 and since this is a metal to metal contact the parts can be clamped together as tightly as desired without danger of damage to the insulation due to the rolling operation.

At the lower end of supporting tube 21 is an inwardly projecting bead forming an annular groove 24 and swiveled in groove 24 is a trolley ear 25. Trolley ear 25 comprises two clamping members 26 and 27 each formed at its upper edge with an inturned semi-circular flange 28 which fits in groove 24 and a flared-out lower end which presents an edge 29 for engagement with a groove in a trolley wire 30. Clamping member 26 is provided with a counter-sunk opening 31 having a smooth edge and clamping member 27 is provided with a counter-sunk opening 32 which is threaded to receive the threads on a clamping screw 33. Clamping screw 33 has at one end a head 34 located in the counter-sunk portion of opening 31 and after the screw has been inserted in openings 31 and 32 its other end is upset as indicated at 34' so the screw cannot work out of the openings. This serves to make the trolley ear a complete unitary structure which cannot come apart during handling or shipping. Screw 31 is of sufficient length so that when screwed out of opening 32 as far as it will come, the clamping members 26 and 27 can be spread apart far enough to permit of flanges 28 being readily slipped over the end of supporting tube 20 and edges 29 being slipped into the trolley wire grooves.

The head of screw 33 is not provided with a slot for manipulating the screw with an ordinary screw-driver, but instead is provided with a polygonal, axially-extending opening 35 adapted to receive a tool having a similar shaped end for turning it. With this arrangement the screw can be tightened with greater ease than with an ordinary screw-driver and there is no danger of the tool slipping out of the slot as in the case of a screw-driver. This is a matter of considerable importance from a practical standpoint as a workman in tightening up a trolley ear is often required to stand in an awkward position and usually on an overhead platform which makes the use of a screw-driver difficult. Also the clamping members can be drawn up tighter with such a tool than would be possible with an ordinary screw-driver. In this connection it will be noted that the trolley ear has no direct contact with the insulating means for it so that no matter how tight it is screwed up it cannot affect the insulation.

The head of screw 33 is cone-shaped as is also the counterbored portion of opening 31 and projecting from the wall of the counterbored portion of the opening are two diametrically opposed projections 36, the outer surfaces of which extend at an angle greater than that of the conical screw head. When the conical head is screwed down against these projections since it has a smaller angle than the projections, it will bind against them thus making the screw self-locking. At the same time the screw can tilt or rock on the projections 36 so that irrespective of the angle to the vertical which the clamping members take, which angle of course varies with the size of the trolley wire, the screw can stand straight relatively to the opening in clamping member 27.

As shown in Fig. 7 the edges 29 of the clamping members are bowed outwardly at their centers so that in tightening them on a trolley wire the corners take hold first. This arrangement insures that when the clamping members are tightened up they will engage the wire along their entire length.

It will be noted that the trolley ear is narrow in width and that by reason of the countersunk openings no part of the clamping screw projects beyond the confines of the ear. As a result it gives good clearances for the flanges of the trolley wheel and will not interfere with the wheel on curves. Furthermore, on account of the swivel joint between the trolley ear and the supporting tube, the ear may be turned to any angle relatively to the support so as to make the ear conform to the direction of the trolley wire on curves or under other conditions which may be met with.

A trolley ear as shown may be connected to other suitable types of supports and in Figs. 4 and 5 I have shown it connected to a supporting member or adapter in the form of a tapped nut 40 having a groove 41 to receive the inturned flanges on the upper ends of clamping members 26 and 27. Nut 40 is adapted to be screwed onto the threaded end of a suitable supporting rod for example.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. In an insulator suspension, the combination of two flat members clamped together and insulated from each other, a sleeve projecting from one of said members and adapted to be fastened to a support, a part projecting from the other of said members, and a trolley ear swiveled on the end of said part.

2. In an insulator suspension, the combination of a flat plate, a ring, a member having a flange located between the plate and ring and insulated therefrom, the edge of the plate being rolled under the ring to form a clamping means for holding the parts together, and a trolley ear swiveled on the end of said member.

3. The combination with a supporting pipe of a suspension having a sleeve which slips over the pipe, a housing at one side of the sleeve, and a angular wedge located in the housing and having an edge which is presented to the side of the pipe and bites into it to fasten the suspension to the pipe.

4. The combination with a supporting element and a supported element, one of which telescopes into the other, of a housing at one side of the other element, and an angular wedge located in the housing and having an edge which is presented to the side of the inner element and bites into it to fasten the elements together.

5. In an insulator suspension, the combination of two flat members insulated from each other, one of said members being turned inwardly at its periphery to fasten the two members together, a part projecting from one of said members adapted to be fastened to a support, and a part projecting from the other of said members adapted to support a trolley ear.

6. In an insulator suspension, the combination of a flat plate, a ring, a member having a flange located between the plate and ring and insulated therefrom, the edge of the plate being rolled under the ring to form a clamping means for holding the parts together, a trolley ear swiveled on the end of said member, and a depending skirt carried by said ring.

In witness whereof, I have hereunto set my hand this 18th day of October, 1920.

GEORGE W. BOWER.